United States Patent [19]

Serinken et al.

[11] 4,198,630
[45] Apr. 15, 1980

[54] DISPLAYS USING THICK FILM SWITCHES TO CONTROL INDIVIDUAL DISPLAY ELEMENTS

[75] Inventors: Nur M. Serinken; David R. Baraff, both of Ottawa, Canada

[73] Assignee: Northern Telecom Limited, Montreal, Canada

[21] Appl. No.: 932,125

[22] Filed: Aug. 9, 1978

[51] Int. Cl.² ............................................. G06F 3/14
[52] U.S. Cl. .................................. 340/784; 340/719; 350/351
[58] Field of Search ................... 340/718, 719, 784; 350/351; 338/7, 217

[56] References Cited

U.S. PATENT DOCUMENTS

| | | | |
|---|---|---|---|
| 3,862,360 | 1/1975 | Dill et al. | 340/719 |
| 4,110,664 | 8/1978 | Asars et al. | 340/719 |
| 4,114,070 | 9/1978 | Asars et al. | 340/719 |
| 4,118,112 | 10/1978 | Thornburg | 350/351 |

*Primary Examiner*—Marshall M. Curtis
*Attorney, Agent, or Firm*—Sidney T. Jelly

[57] ABSTRACT

Each element of a display operated in a scan mode is series connected to a thick film switch which sets a voltage threshold to isolate the element from periodic scan pulses unless coincident with an element selecting data pulse in which case the thick film switches and the element, for example, a nematic liquid crystal cell, operates.

5 Claims, 5 Drawing Figures

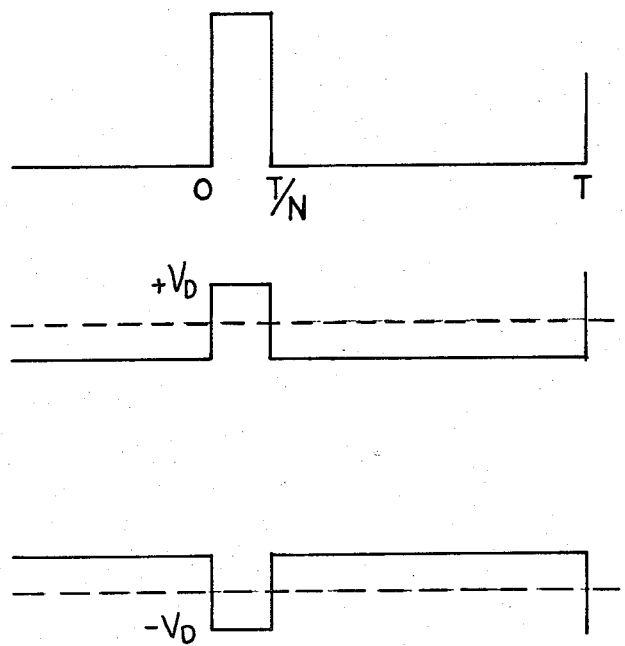
*Fig-3-*
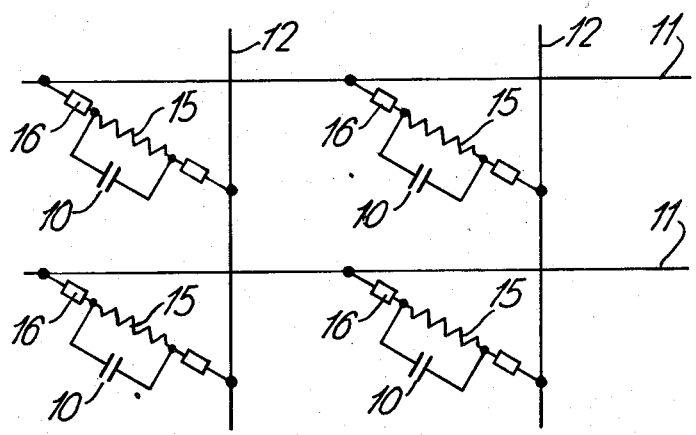
*Fig-4-*

DISPLAYS USING THICK FILM SWITCHES TO CONTROL INDIVIDUAL DISPLAY ELEMENTS

This invention relates to displays using thick film switches to control individual display elements. The invention finds particular application in liquid crystal displays.

In a typical liquid crystal display a number of electric field sensitive cells are located at the interstices of a matrix of row and column electrodes. A data signal applied to the display has a signal component consisting of scan pulses which are applied to successive ones of one set, say the rows, of electrodes and data pulses which are applied to appropriate ones of the columns of electrodes. The data pulses may be positive $+V_D$ or negative $-V_D$ whereas the scan pulses are arranged to be single valued, say $v_s$. Thus when the potential difference across a cell is a maximum $V_D+v_s$, the liquid crystal molecules are orientated so that the cell twists the plane of polarization of polarized light and when the potential difference is a minimum, $v_s-V_D$ the liquid crystal molecules adopt random orientation and the plane is not twisted. In fact, because of the rate at which the scan pulses are applied, the cells respond to the r.m.s. of the applied voltage, so cells although not selected for data pulses, receive a voltage higher than $v_s-V_D$ and consequently exhibit a partial "on" state. This wastes power and can reduce contrast between "on" and "off" parts of the display. The invention envisages a threshold circuit which is operable to enhance the display contrast.

According to the invention there is provided a display cell comprising a plurality of display elements, each display element defined by a pair of spaced electrodes flanking a material whose optical transmissivity is dependent on potential difference applied thereacross, means for applying a potential difference between the electrodes of each element, a plurality of switch elements series-connected to respective display elements, each switch element comprising a thick film of material having a large negative temperature co-efficient of resistance in a predetermined switching temperature zone wherein, in use, a switch element subjected to a predetermined threshold potential difference experiences joule heating to said switching temperature zone. In one embodiment of the invention the element comprises a liquid crystal cell in parallel with a resistor. The liquid crystal cell can be a pair of crossed polarizing plates with a layer of nematic liquid crystal material sealed therebetween.

In an alternative embodiment of the invention the element comprises resistive material coated with a layer of cholesteric liquid crystal material on a darkened substrate.

In the first embodiment a sufficiently high potential difference existing across the cell so orientates the nematic liquid crystal molecules that the plane of polarization of light incident on one polarizing plate is not extinguished by the other polarizing plate after passing through the cell.

In the second embodiment the thick film switch permits current to flow through and thereby heat the resistive material which, in turn, produces a colour change in the cholesteric film.

Preferably each display element has two such series connected thick film switches, one each side of said element and connecting the element to the respective control electrodes.

Two embodiments of the invention will now be described by way of example with reference to the accompanying drawings, in which:

FIG. 3 shows the components of a signal for operating the display of FIG. 1;

FIG. 4 shows the circuit arrangement of FIG. 2 enhanced by the addition of threshold circuit.

Figure 1:
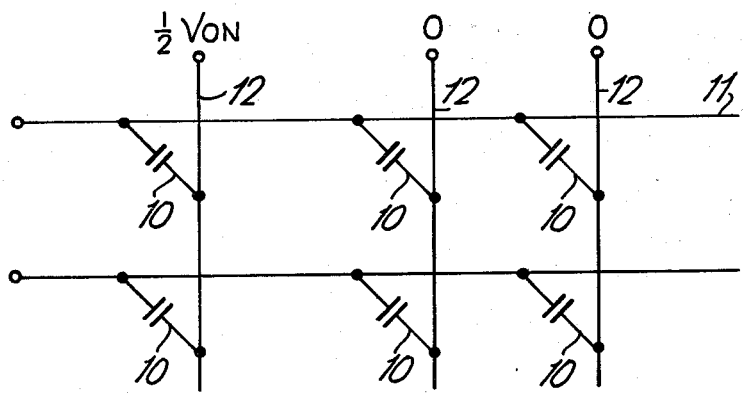
FIG. 1 shows a circuit arrangement of part of a liquid crystal display indicating electrical connections between elements of the display and scan and data electrodes.

Referring to the drawings in detail, FIG. 1 shows in circuit schematic form a number of liquid crystal cells 10 connected into a cartesian matrix of electrodes 11 and 12. The cells 10 comprise two crossed polarizing plates between which is a layer of nematic liquid crystal material. The effect of applying electric field across the cell is to align molecules of material in such a way that the plane of polarization of light entering the cell through one polarizing plate is twisted and so a component of that light escapes through the other polarizing plate. A large number of the cells connected into the matrix is used as a display panel. In operation, one component of a display signal is applied successively to row electrodes 11 while another component of the display signal is applied to appropriate ones of the column electrodes 12. According to the total potential difference, and therefore electric field, produced across the liquid crystal cell, the cell transmits a percentage of incident light as indicated graphically by plot I in FIG. 2.

A scanning pulse is applied cyclically to the electrodes 11 which are termed the scan electrodes, the applied scanning pulses being of fixed amplitude and sense. On the other hand, the electrodes 12, termed the data electrodes, receive, as appropriate, a data pulse, the timing of the pulse and the selection of electrode corresponding to a character to be displayed and being derived through pulse generation circuitry (not shown). As shown in FIG. 3 the data pulse may be positive or negative according to whether the particular element is required to transmit light or not. If the scan pulse is at $+v_s$ and the data pulse is $V_D$ then the total potential difference across the cell may be $v_s-V_D$ and the cell characteristics are so chosen that in the resulting electric field the cell does not transmit light. Similarly if the potential difference across the cell is $v_s+V_D$, then the corresponding electric field will be such that the cell transmits.

Figure 2:
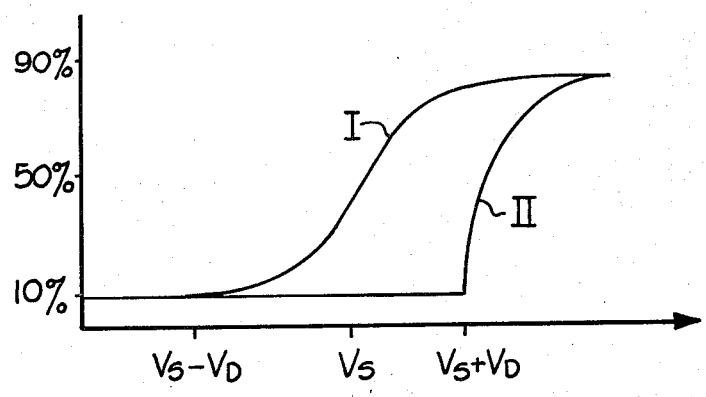
FIG. 2 is a graphical representation of the percentage light transmission through a liquid crystal cell as a function of the potential difference applied across the cell.

FIG. 2 shows graphically the relationship between electric field and light transmission for a liquid crystal cell. It is clearly shown that the transmission characteristic of a liquid crystal cell changes over a relatively extensive range of electric field strengths. Consequently when the scanning pulse is applied to a scan electrode without a data pulse being applied to a data electrode, there is still some light transmission. Because the scan pulses are applied at a very high rate, the liquid crystal responds to the r.m.s. of the scan pulse voltage the effect being that the liquid crystal cell is, throughout use, in a partially "on" state. This is undesirable for two reasons: firstly, power is dissipated and secondly contrast suffers.

Referring now to FIG. 4 there is shown part of a matrix of liquid crystal cells with connections to scan electrodes and data electrodes, respectively 11 and 12. Between every scan electrode and data electrode are connected in parallel a liquid crystal cell 10 and a resistance 15. This parallel combination is series connected via thick film switches 16 which are chosen to operate when a voltage of $v_s + V_D$ is applied between a pair of electrodes 11 and 12. As soon as the thick film switches 16 are brought into a low resistance state, terminals of the liquid crystal cell 10 are connected to a high potential difference, and the liquid crystal immediately changes its light transmission as shown at II in FIG. 3. For an unselected cell, the thick film switch is "off" and has a resistance approximately $10^4 \times$ its resistance when conducting. Consequently very little current flows through the resistance 15, potential across the liquid crystal cell 10 is negligible, and the cell is accordingly maintained in a completely "off" condition.

Figure 5:
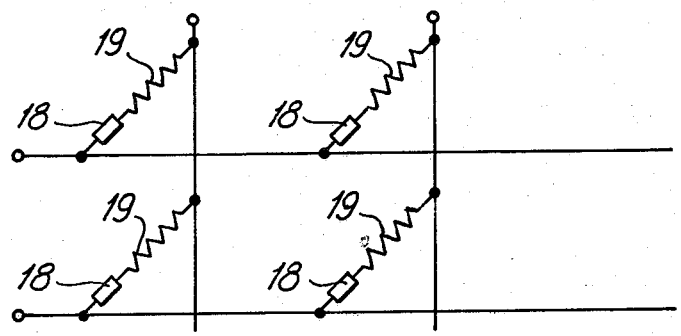
FIG. 5 shows a circuit arrangement similar to that shown in FIG. 3 but where elements of the display comprise heat responsive layers of cholesteric liquid crystal material.

In another embodiment of the invention shown in FIG. 5 a similar matrix of electrodes are used. Between each scan electrode 11 and data electrode 12 is connected in series a thick film switch 18 and a resistance 19 of the order of 50 K ohms. The resistance 19 is in the form of a resistive strip which is coated with cholesteric liquid crystal material. The nature of cholesteric material is that across a certain temperature range it will change colour and at a threshold temperature an anisotropic to isotropic transition occurs accompanied by a change from opaqueness to transparency. Cooling the cholesteric material down results in the reverse sequence.

In a preferred embodiment the resistive material, by means of which the cholesteric liquid crystal material is heated to change its light transmission characteristics, is formed integrally with a thick film switch. A cartesian matrix of row and column electrodes has thick film switches deposited at the interstices of the electrodes. The substrate in the neighbourhood of the thick film switches is coated with a dark ink and the cholesteric liquid crystal is sprayed onto the ink before being encapsulated by a transparent protective cover of plastic or glass.

While the thick film switch is in its non-conducting state, the cholesteric liquid crystal material will be at a low temperature and will exhibit a bright colour. When an information signal is applied to the matrix of electrodes as described with reference to the previous embodiment, the thick film switches become conducting, and are thereby resistively heated to a threshold temperature at which the cholesteric liquid crystal material changes state. In the embodiment described, the presence of a data pulse on a data electrode 12 will be such as to produce a change from colour to darkness in its associated display panel element.

Other cholesteric liquid crystals are known which are colourless below a threshold temperature and exhibit colour above this threshold. In a corresponding display panel, the appearance will be of coloured elements on a black background.

A typical thick film switch for use in operating both the nematic liquid crystal display and the cholesteric liquid crystal display is vanadium oxide ($VO_2$) which switches at approximately 70° C. Appropriate cholesteric material is obtainable from Ashley Butler Inc. under specification CR (colourless to coloured; operating at a temperature within the range of 0° C. to 150° C.), or specification CC (coloured to colourless; operating at a temperature range 20° C. to 70° C.).

What is claimed is:

1. A display cell comprising a plurality of display elements, each display element defined by a pair of spaced electrodes flanking a material whose optical transmissivity is dependent on potential difference applied thereacross, means for applying a potential difference between the electrodes of each element, a plurality of switch elements series-connected to respective display elements, each switch element comprising a thick film material having a large negative temperature coefficient of resistance in a predetermined switching temperature zone, wherein, in use, switch elements subjected to the predetermined threshold potential difference experience joule heating to said switching temperature zone.

2. A display cell as claimed in claim 1 in which said material is a liquid crystal.

3. A display cell as claimed in claim 2 in which the spaced electrodes and said thick film switches are formed on spaced transparent plates flanking a nematic liquid crystal.

4. A display cell as claimed in claim 2 in which said material is a cholesteric liquid crystal overlying a resistive material on a reflective substrate, the resistive material being adapted to undergo joule heating when said thick film switches whereby to heat the liquid crystal and so induce a transmissivity change therein.

5. A display cell as claimed in claim 1, in which said material comprises vanadium oxide ($VO_2$).

* * * * *